United States Patent
Nakai et al.

(10) Patent No.: US 7,568,055 B2
(45) Date of Patent: Jul. 28, 2009

(54) DATA PROCESSING APPARATUS FOR SELECTING EITHER A PIO DATA TRANSFER METHOD OR A DMA DATA TRANSFER METHOD

(75) Inventors: Yoshiyuki Nakai, Nara (JP); Koichi Sumida, Tenri (JP); Takao Yamanouchi, Yamatokoriyama (JP); Yohichi Shimazawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 446 days.

(21) Appl. No.: 11/112,567

(22) Filed: Apr. 21, 2005

(65) Prior Publication Data

US 2005/0237560 A1 Oct. 27, 2005

(30) Foreign Application Priority Data

Apr. 22, 2004 (JP) ............................. 2004-127068

(51) Int. Cl.
- G06F 3/00 (2006.01)
- G06F 13/28 (2006.01)
- G06F 13/00 (2006.01)
- G06F 5/00 (2006.01)
- G06F 15/167 (2006.01)
- G06F 9/30 (2006.01)
- G06F 9/00 (2006.01)
- G06F 7/04 (2006.01)

(52) U.S. Cl. ............................. 710/33; 710/11; 710/22; 710/23; 710/24; 710/25; 710/26; 710/27; 710/28; 710/38; 709/212; 712/226; 712/229; 726/2; 726/26

(58) Field of Classification Search ..................... 710/38
See application file for complete search history.

(56) References Cited

U.S. PATENT DOCUMENTS

| | | | | |
|---|---|---|---|---|
| 5,379,381 | A * | 1/1995 | Lamb | 710/6 |
| 2003/0234868 | A1* | 12/2003 | Katayama | 348/207.1 |
| 2004/0139214 | A1* | 7/2004 | Hinshaw et al. | 709/231 |
| 2005/0120144 | A1* | 6/2005 | Koyama | 710/8 |

FOREIGN PATENT DOCUMENTS

| | | |
|---|---|---|
| CN | 1373461 | 10/2002 |
| JP | 64-064173 | 3/1989 |
| JP | 2000-347675 | 12/2000 |
| JP | 2002-057997 | 2/2002 |
| JP | 2002-229861 | 8/2002 |
| JP | 2004-032315 | 1/2004 |

* cited by examiner

*Primary Examiner*—Henry W. H. Tsai
*Assistant Examiner*—Kris Rhu
(74) *Attorney, Agent, or Firm*—Edwards Angell Palmer & Dodge LLP; David G. Conlin; David A. Tucker

(57) ABSTRACT

The image processing apparatus (data processing apparatus) stores data in a storing unit (storing means), inputs and outputs the data to and from the storing unit via a storage control unit (input-output means) and processes the data outputted from the storing unit with a control unit (processing means). The storage control unit inputs and outputs image data to and from the storing unit by the DMA method through a path via a DMA control unit and inputs and outputs other data such as a control instruction to and from the storing unit by the PIO method through a path via a PIO control unit. Image data to be inputted and outputted to and from the storing unit by the DMA method is encrypted in an input operation and decrypted in an output operation by an encryption/decryption unit provided on the input-output path for DMA method.

6 Claims, 2 Drawing Sheets

DATA PROCESSING APPARATUS FOR SELECTING EITHER A PIO DATA TRANSFER METHOD OR A DMA DATA TRANSFER METHOD

CROSS-REFERENCE TO RELATED APPLICATIONS

This Nonprovisional application claims priority under 35 U.S.C. §119(a) on Patent Application No. 2004-127068 filed in Japan on Apr. 22, 2004, the entire contents of which are hereby incorporated by reference.

BACKGROUND OF THE INVENTION

1. Field of the Invention

The present invention relates to a data processing apparatus capable of reducing the burden on a control unit associated with encryption and decryption of stored data.

2. Description of Related Art

In recent years, integration of functions has been advanced for an image processing apparatus which is provided with a copying function for scanning an original image and copying the image. An image processing apparatus provided with a plurality of functions has been put to practical use by adding, to a copying function, a network printer function for receiving image data from an outer device such as a personal computer (PC) and outputting an image when the apparatus is connected with a communication network such as the LAN, and a facsimile function for transmitting and receiving image data to and from an outer facsimile machine using a facsimile communication and the like. Such an image processing apparatus comprises storing means, such as a hard disk or a semiconductor memory, for temporarily storing image data to be processed. An image processing apparatus can process a plurality of image data effectively without causing stagnation by storing inputted image data in sequence in storing means and processing image data stored in the storing means when its turn for processing comes.

Some image data to be processed by an image processing apparatus in a copying operation of an original image or in an output operation of an image includes confidential information such as a document with personal information or trade secret. When image data including confidential information is stored in storing means of an image processing apparatus, information is at risk for being leaked by unjust fetch of image data stored in the storing means. A technique has been therefore developed for preventing unjust fetch of image data stored in storing means and leakage of information, by storing image data in an encrypted form in storing means and processing the image data after decrypting the encrypted image data (see, for example, Japanese Patent Application Laid-Open No. S64-64173 (1989)).

In addition to image data itself, data to be processed by an image processing apparatus further includes other data such as a processing instruction of image data or a control instruction of storing means. Since it is needless to encrypt these data other than image data, it is required to discriminate data which is to be encrypted from data which is not to be encrypted. A conventional image processing apparatus comprises a control unit constructed with a CPU, a RAM and the like, and the control unit controls various functions of the image processing apparatus such as a copying function, a facsimile function and storing means and discriminates data to process encryption and decryption of image data. Consequently, an image processing apparatus for processing encryption and decryption of image data has a problem that the burden on the control unit is large. Especially, when the image processing apparatus deals a color image, the burden on the control unit is significantly increased since color image data has a volume extremely larger than monochrome image data. Consequently, there is a problem that the processing efficiency and the processing speed of an image processing apparatus are lowered as the burden on the control unit is increased. There is another problem that the cost of an image processing apparatus rises when a high-performance control unit is used to avoid lowering of the processing efficiency and the processing speed of an image processing apparatus.

BRIEF SUMMARY OF THE INVENTION

The present invention has been made with the aim of solving the above problems, and it is an object thereof to provide a data processing apparatus capable of reducing the burden on a control unit associated with encryption and decryption of data stored in storing means.

Another object of the present invention is to provide a data processing apparatus for preventing leakage of information by encrypting image data when storing means stores the image data.

Further object of the present invention is to provide a data processing apparatus capable of increasing the processing speed of encryption and decryption of data.

A data processing apparatus according to the present invention is a data processing apparatus comprising storing means for storing data, input-output means for inputting and outputting data to and from the storing means and processing means for processing data outputted from the storing means by the input-output means, characterized in that the input-output means is constructed to input and output data to and from the storing means using any one of a first data transfer method in which the processing means is less involved in control of data transfer and a second data transfer method in which the processing means is more involved in control of data transfer, the input-output means provides judging means for judging which of the first data transfer method and the second data transfer method is to be used according to the sort of data, and the input-output means has means for encrypting data to be inputted to the storing means using the first data transfer method and means for decrypting data to be outputted from the storing means using the first data transfer method.

In the present invention, a data processing apparatus for storing data in storing means and processing the stored data inputs and outputs data to and from the storing means using any one of a first data transfer method in which a control unit (control means) is less involved in control of data transfer and a second data transfer method in which the control unit is more involved in control of data transfer. Moreover, the data processing apparatus comprises means for encrypting data to be inputted to the storing means in an input operation and decrypting the data to be outputted from the storing means in an output operation, by the first data transfer method.

A data processing apparatus according to the present invention is characterized in that the judging means is constructed to judge that the input-output means is to use the first data transfer method when it is judged that the sort of the data is data to be encrypted.

A data processing apparatus according to the present invention is characterized in that the judging means is constructed to judge that the input-output means is to use the first data transfer method when it is judged that the sort of the data is image data.

A data processing apparatus according to the present invention is characterized in that the judging means is constructed to judge that the input-output means is to use the first data transfer method when it is judged that the sort of the data is text data.

Moreover, in the present invention, when it is judged that the sort of data is image data, this image data is inputted and outputted to and from the storing means by the first data transfer method while encrypting the image data in an input operation and decrypting the image data in an output operation.

A data processing apparatus according to the present invention is characterized in that the first data transfer method is a DMA method and the second data transfer method is a PIO method.

Furthermore, in the present invention, the first data transfer method is a DMA method and the second data transfer method is a PIO method, wherein data to be inputted and outputted to and from the storing means by the DMA method is encrypted in an input operation and decrypted in an output operation.

With the present invention, since input-output means performs processes of inputting and outputting data to be encrypted to and from storing means using a first data transfer method in which a control unit (processing means) is less involved and encrypting and decrypting data to be inputted and outputted using the first data transfer method, the burden on the control unit for controlling data processing is reduced. Accordingly, the processing efficiency and the processing speed of the data processing apparatus can be increased. Moreover, since it is needless to use a high-performance control unit, it is possible to curb a cost rise of the data processing apparatus.

Moreover, with the present invention, since storing means stores image data in an encrypted form, it is possible to prevent leakage of confidential information included in image data due to unjust fetch of image data stored in the storing means.

Furthermore, with the present invention, since data which needs to be encrypted and decrypted is inputted and outputted to and from storing means by a DMA method which has a transfer speed higher than a PIO method, the present invention offers beneficial effects such as an increase of the processing speed of encryption and decryption.

The above and further objects and features of the invention will more fully be apparent from the following detailed description with accompanying drawings.

DETAILED DESCRIPTION OF THE INVENTION

The following description will explain the present invention in the concrete with reference to the drawings illustrating an embodiment thereof.

Figure 1:
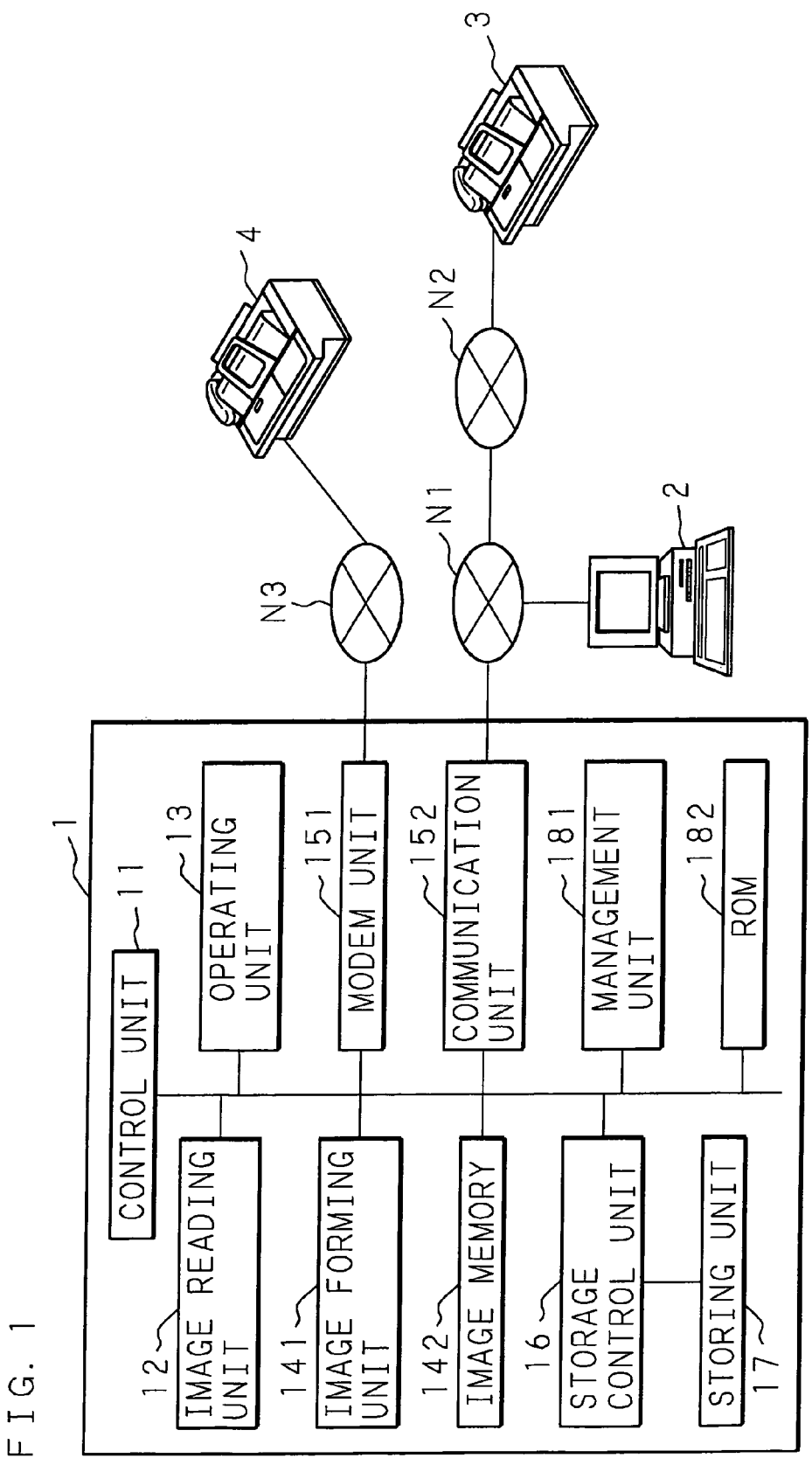
FIG. 1 is a functional block diagram showing the internal functional structure of an image processing apparatus which is a data processing apparatus of the present invention.

FIG. 1 is a functional block diagram showing the internal functional structure of an image processing apparatus which is a data processing apparatus of the present invention. The image processing apparatus 1 comprises a control unit (processing means) 11 constructed with a CPU for carrying out an operation, a RAM for storing temporal information associated with the operation and the like. The control unit 11 is connected with a ROM 182 which stores a control program for controlling the image processing apparatus 1 and with a management unit 181 which is a memory for storing management information for managing a process to be performed by the image processing apparatus 1. The control unit 11 is also connected with an image reading unit 12 for reading an image recorded on paper and generating image data.

The control unit 11 is also connected with a modem unit 151, which is connected with a public line network N3, for performing a facsimile communication. The image processing apparatus 1 can transmit image data generated by the image reading unit 12 to another facsimile machine 4 via the public line network N3 connected with the modem unit 151 using a facsimile communication. The control unit 11 is also connected with an image memory 142 for temporarily storing image data and with an image forming unit 141 for forming an image from the image data stored in the image memory 142 and recording the image on paper. The image processing apparatus 1 receives image data transmitted from another facsimile machine via the public line network N3 using a facsimile communication with the modem unit 151 and forms an image from the image data with the image forming unit 141.

The image processing apparatus 1 thus functions as a facsimile machine. The image processing apparatus 1 also functions as a copying machine by forming an image read by the image reading unit 12 with the image forming unit 141.

The control unit 11 is also connected with a communication unit 152 which is connected with a communication network N1. The communication unit 152 receives image data from a personal computer (PC) 2 connected with the communication network N1 via the communication network N1, and the image forming unit 141 forms an image from the received image data. The image processing apparatus 1 thus functions as a printer.

The communication network N1 is further connected with a wide area communication network N2 such as the Internet. The communication unit 152 can transmit and receive image data to and from another facsimile machine 3 connected with the wide area communication network N2 via the communication network N1 and the wide area communication network N2 by a method, for example, of attaching image data in an electronic mail to transmit and receive the image data. The image processing apparatus 1 thus functions as an Internet facsimile machine.

The control unit 11 is also connected with an operating unit 13 for accepting an operation from the user. The operating unit 13 is composed of display means, such as a liquid crystal panel, for displaying information necessary for the operation and input means, such as a touch panel or a ten key, by which information such as a control instruction is inputted by the operation of the user.

The control unit 11 is further connected with a storing unit (storing means) 17 via a storage control unit (input-output means) 16. The storing unit 17, which is storing means according to the present invention, is constructed with a hard disk, a nonvolatile semiconductor memory, an optical disk or the like. The storage control unit 16, which is input-output means according to the present invention, controls data to be inputted and outputted to and from the storing unit 17.

The image processing apparatus 1, which is a data processing apparatus of the present invention, once stores in the image memory 142 image data generated by the image reading unit 12 and image data received by the modem unit 151 or by the communication unit 152 and inputs these image data from the image memory 142 to the storing unit 17 via the storage control unit 16. The storing unit 17 stores the inputted image data. The image processing apparatus 1 also performs a process of reading image data from the storing unit 17 via the storage control unit 16, storing the read image data in the image memory 142, and forming an image with the image forming unit 141, a process of transmitting image data from the modem unit 151 using a facsimile communication or a process of transmitting image data from the communication unit 152. Moreover, the control unit 11 of the image processing apparatus 1 inputs other data such as a processing instruction of image data or a control instruction of storing means to the storing unit 17 via the storage control unit 16.

Figure 2:
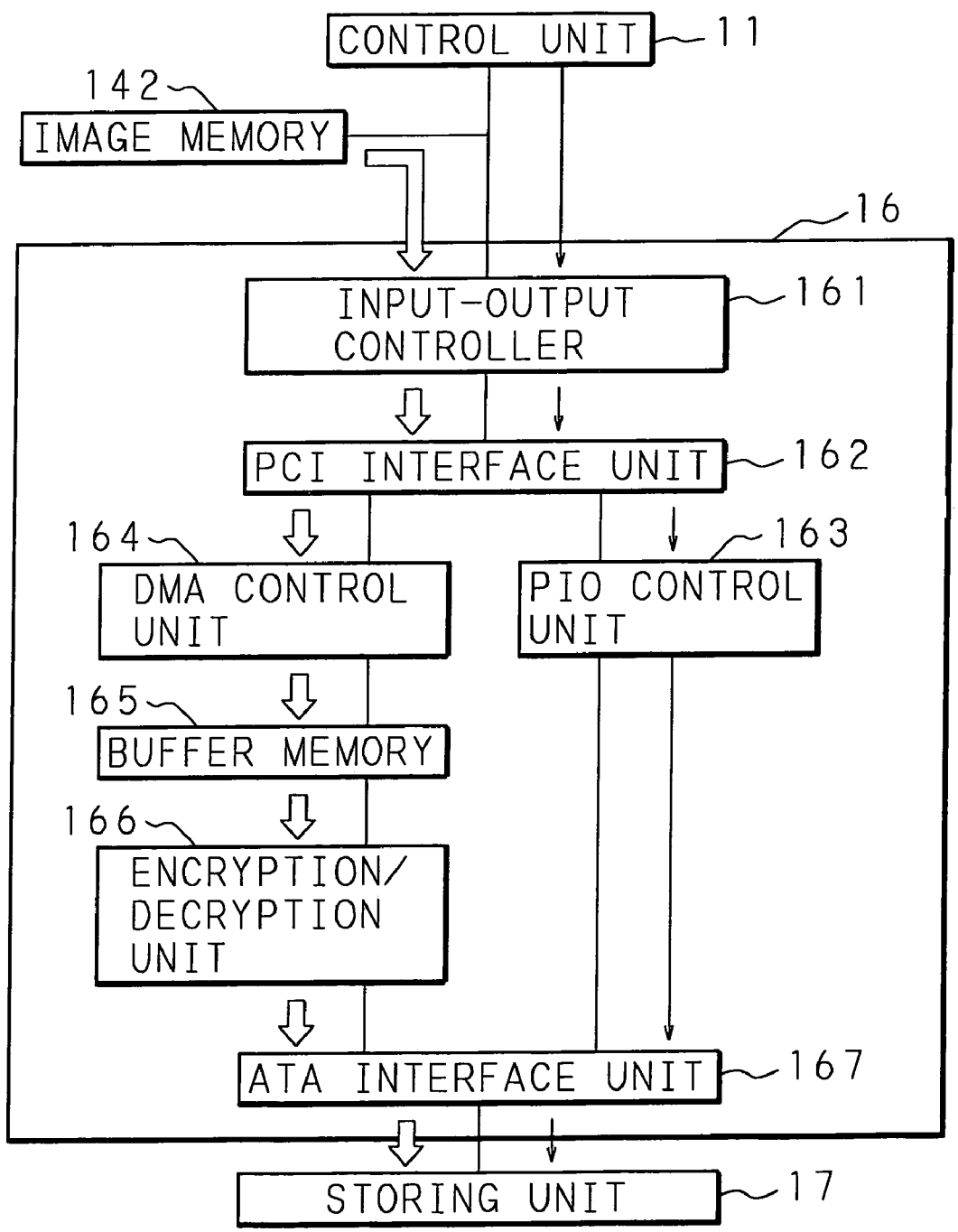
FIG. 2 is a block diagram showing the internal structure of a storage control unit.

FIG. 2 is a block diagram showing the internal structure of the storage control unit 16. The storage control unit 16 comprises an input-output controller (judging means) 161 connected with the image memory 142 and with the control unit 11. The input-output controller 161 is connected with a PCI (Peripheral Component Interconnect) interface unit 162. The storage control unit 16 also comprises an ATA (AT Attachment) interface unit 167 which is connected with the storing unit 17.

The PCI interface unit 162 is connected with a PIO (Programmed I/O) control unit 163 and with a DMA (Direct Memory Access) control unit 164. The PIO control unit 163 is connected with the ATA interface unit 167 and the PCI interface unit 162 is connected with the ATA interface unit 167 via the PIO control unit 163. Moreover, the DMA control unit 164 is connected with a buffer memory 165, which is further connected with an encryption/decryption unit (encryption/decryption means) 166 that is connected with the ATA interface unit 167. Accordingly, the PCI interface unit 162 and the ATA interface unit 167 are connected with each other through two paths: a path via the PIO control unit 163 and another path via the DMA control unit 164, the buffer memory 165 and the encryption/decryption unit 166.

The input-output controller 161 is composed of a CPU, a memory and an ASIC. The input-output controller 161 judges which data transfer method of a PIO method in which input and output of data is controlled by the control unit 11 and a DMA method in which data is inputted and outputted without being controlled by the control unit 11 is to be used to input and output data to be inputted and outputted to and from the storing unit 17. In particular, the input-output controller 161 judges data, which is sent from the control unit 11 to be inputted to the storing unit 17, to be inputted by the PIO method and judges data, which is transferred from the image memory 142 according to an instruction from the control unit 11, to be inputted by the DMA method. Accordingly, data which is inputted to the storing unit 17 by the DMA method is image data which needs to be encrypted while data which is inputted to the storing unit 17 by the PIO method is data other than image data such as a processing instruction of image data or a control instruction of the storing means.

Data which has been judged by the input-output controller 161 to be inputted by the PIO method is sent from the PCI interface unit 162 to the ATA interface unit 167 via the PIO control unit 163 and inputted from the ATA interface unit 167 to the storing unit 17. That is, data other than image data is inputted to the storing unit 17 through the path denoted by a black arrow in FIG. 2.

Data which has been judged by the input-output controller 161 to be inputted by the DMA method is inputted from the PCI interface unit 162 to the encryption/decryption unit 166 via the DMA control unit 164 and the buffer memory 165. The encryption/decryption unit 166 encrypts the inputted data and transfers the encrypted data to the ATA interface unit 167. The ATA-interface unit 167 inputs the encrypted data to the storing unit 17 and the storing unit 17 stores the encrypted data. That is, the image data is sent through the path denoted by an arrow relieved in white in FIG. 2, encrypted by the encryption/decryption unit 166 and stored in the storing unit 17.

Data which has been inputted to the storing unit 17 by the PIO method is outputted from the storing unit 17 similarly by the PIO method via the PIO control unit 163. Image data which has been inputted to the storing unit 17 by the DMA method and stored is outputted from the storing unit 17 by the DMA method. Here, the encryption/decryption unit 166 decrypts image data outputted from the storing unit 17 by the DMA method.

As described above in detail, in the present invention, data to be inputted and outputted to and from the storing unit 17 by the DMA method and data to be inputted and outputted to and from the storing unit 17 by the PIO method are determined from each other, and data to be inputted and outputted to and from the storing unit 17 by the DMA method is encrypted in an input operation and decrypted in an output operation. Data to be inputted and outputted to and from the storing unit 17 by the DMA method is image data to be inputted from the image memory 142 to the storing unit 17. That is, the image processing apparatus 1 once stores in the image memory 142 image data generated by the image reading unit 12, image data received by the modem unit 151 or image data received by the communication unit 152, encrypts image data transferred from the image memory 142 by the DMA method with the encryption/decryption unit 166 and stores the encrypted image data in the storing unit 17. Moreover, image data which has been encrypted and stored in the storing unit 17 is decrypted by the encryption/decryption unit 166 and read by the image memory 142, and the image processing apparatus 1 performs a process of forming an image with the image forming unit 141, a process of transmitting image data from the modem unit 151 using a facsimile communication or a process of transmitting image data from the communication unit 152.

In the present invention, since the storing unit 17 stores image data in an encrypted form, it is possible to prevent leakage of confidential information included in image data due to unjust fetch of image data stored in the storing unit 17. Moreover, in the present invention, image data to be encrypted is inputted and outputted to and from the storing unit 17 by the DMA method in which the control unit 11 is less involved in control of data transfer and the encryption/decryption unit 166 performs encryption and decryption processes of image data to be inputted and outputted by the DMA method. Since the control unit 11 is less involved in image data to be encrypted and the encryption/decryption unit 166 performs encryption and decryption processes of image data which conventionally need to be performed by the control unit 11, the burden on the control unit 11 for processing is reduced. Accordingly, the processing efficiency and the processing speed of the image processing apparatus 1 can be increased. Especially, in a case of processing color image data having a large data volume, lowering of the processing efficiency and the processing speed can be also curbed as much as possible. Moreover, since it is needless to use a high-performance control unit 11, it is possible to curb a cost rise of the image processing apparatus 1.

Moreover, in the present invention, since image data which has a large data volume and further needs to be encrypted and decrypted is inputted and outputted to and from the storing unit 17 by the DMA method which has a transfer speed higher than the PIO method, the processing speed of input and output of image data having a large data volume and of encryption and decryption thereof can be increased. Moreover, in the present invention, since data to be dealt with by the control unit 11 including data to be inputted and outputted to and from the storage control unit 16 is plaintext data, the control unit 11 can control the image processing apparatus 1 by a simple process similarly to an image processing apparatus which does not perform encryption, though the storing unit 17 encrypts and protects image data.

It should be noted that, though the image processing apparatus 1 in this embodiment is a complex machine provided with a plurality of functions such as a facsimile machine and a printer, the present invention is not limited to this but may be an apparatus having a single function such as a facsimile machine, a copying machine or a printer. Moreover, though this embodiment has shown an image processing apparatus 1 as a data processing apparatus according to the present invention, the present invention is not limited to this but may be an embodiment for processing data other than image data such as text data.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A data processing apparatus comprising:
   a storing unit for storing data;
   an input-output unit for inputting and outputting data to and from the storing unit; and
   a processing unit for processing data outputted from the storing unit by the input-output unit, wherein
      the input-output unit inputs and outputs data to and from the storing unit using any one of a first data transfer method, which is a DMA method, and a second data transfer method, which is a PIO method, and the input-output unit comprises:
         a judging unit for judging which of the first data transfer method and the second data transfer method is to be used according to whether or not a sort of data is image data such that the input-output unit inputs and outputs data to and from the storage unit using the second transfer method, which is the PIO method, when the judging unit judges that the sort of data is data other than image data, including a processing instruction of image data or a control instruction of the storing unit,
         an encryption unit for encrypting data to be inputted to the storing unit using the first data transfer method, which is a DMA method, when the judging unit judges that the sort of data is image data; and
         a decryption unit for decrypting data to be outputted from the storing unit using the first data transfer method, which is a DMA method, when the judging unit judges that the sort of data is image data.

2. The data processing apparatus according to claim 1, wherein the judging unit judges that the input-output unit is to use the first data transfer method when it is judged that the sort of the data is data to be encrypted.

3. The data processing apparatus according to claim 2, wherein the judging unit judges that the input-output unit is to use the first data transfer method when it is judged that the sort of the data is text data.

4. A data processing apparatus comprising:
   a storing means for storing data;
   an input-output means for inputting and outputting data to and from the storing means; and
   a processing means for processing data outputted from the storing means by the input-output means, wherein
      the input-output means inputs and outputs data to and from the storing means using any one of a first data transfer method , which is a DMA method, and a second data transfer method, which is a PIO method, and the input-output means comprises:
         judging means for judging which of the first data transfer method and the second data transfer method is to be used according to whether or not a sort of data is image data such that the input-output unit inputs and outputs data to a from the storing unit using the second data transfer method, which is the PIO method, when the judging unit judges that the sort of data is data other than image data1 including a processing instruction of image data, a control instruction of the storing unit,
         means for encrypting data to be inputted to the storing means using the first data transfer method, which is a DMA method, when the judging unit judges that the sort of data is image data; and
         means for decrypting data to be outputted from the storing means using the first data transfer method, which is a DMA method, when the judging unit judges that the sort of data is image data.

5. The data processing apparatus according to claim 4, wherein the judging means judges that the input-output means is to use the first data transfer method when it is judged that the sort of the data is data to be encrypted.

6. The data processing apparatus according to claim 5, wherein the judging means judges that the input-output means is to use the first data transfer method when it is judged that the sort of the data is text data.

* * * * *